United States Patent [19]
Goeldner

[11] Patent Number: 5,325,089
[45] Date of Patent: Jun. 28, 1994

[54] TWO-STAGE, AT LEAST DOUBLED ATM REVERSING SWITCHING NETWORK HAVING (2N×2N) SWITCHING MATRICES

[75] Inventor: Ernst-Heinrich Goeldner, Munich, Fed. Rep. of Germany

[73] Assignee: Siemens Aktiengesellschaft, Munich, Fed. Rep. of Germany

[21] Appl. No.: 844,194

[22] Filed: Mar. 2, 1992

[30] Foreign Application Priority Data

Mar. 14, 1991 [EP] European Pat. Off. ........ 91103977.4

[51] Int. Cl.$^5$ .......................... H04Q 1/16; H04B 1/74; H04M 1/00
[52] U.S. Cl. .......................... 340/825.8; 340/825.79; 340/826; 370/60.1; 370/65; 379/272
[58] Field of Search ................ 340/825.79, 825.8, 826, 340/827, 825.01, 825.02, 825.03; 370/54, 58.3, 59, 63, 65, 65.5, 68, 60, 60.1; 379/272, 273, 291, 292, 271

[56] References Cited

U.S. PATENT DOCUMENTS

| | | | |
|---|---|---|---|
| 4,173,713 | 11/1979 | Giesken et al. | 370/65 |
| 4,201,891 | 5/1980 | Lawrence et al. | 370/58.3 |
| 5,032,837 | 7/1991 | Yoshifuji | 340/826 |
| 5,103,220 | 4/1992 | Brünle | 340/826 |

FOREIGN PATENT DOCUMENTS

0384936 9/1990 European Pat. Off. .
0384961 9/1990 European Pat. Off. .

OTHER PUBLICATIONS

"A Study of Non-Blocking Switching Networks", C. Clos, Bell System Technical Journal, Mar. 1953, pp. 406–424.
"Performance Analysis of Asymmetric Packet Switch Modules With Channel Grouping" by Soung Liew et al, IEEE Indocom 1990, Jun. 3–7, 1990 pp. 668–676.
"ATM ermoglicht unterschiedliche Bitraten im einheitlichen Breitbandnetz", K. A. Lutz, Siemens AG, Intercom Report, 11, 1988, pp. 210–213.
International Switching Symposium 1990, "Innovations in Switching Technology" Stockholm, Sweden, May 28–Jun. 1, 1990, p. 109.
Electronic Letters 26, Aug. 2, 1990, No. 16, Stevenage, Herts, GB, "High Voltage Microwave DC Block for Microstrip Ground Planes", H. Obara et al, p. 1287.
International Switching Symposium 1990, "An ATM Architecture With Intrinsic Multicast Capabilities for the Belgian Broadband Experiment", by DeSomer et al, Stockholm, Sweden, May 28–Jun. 1, 1990 pp. 111–118.

*Primary Examiner*—Donald J. Yusko
*Assistant Examiner*—Mark H. Rinehart
*Attorney, Agent, or Firm*—Hill, Steadman & Simpson

[57] ABSTRACT

Two-stage, at least doubled ATM reversing switching network having (2n×2n) switching matrices. For expanding a two-stage, doubled ATM self-routing reversing switching network, the switching matrices of the B switching stage can be respectively doubled in one redundancy level after another without interrupting operation given a simultaneously, respective halving of the plurality and filling of duplex link groups formed from the very outset and proceeding between A-switching stage and B-switching stage, of which duplex link groups only duplex links of one and the same group of links are occupied for every connection lasting during an expansion of the switching network.

6 Claims, 3 Drawing Sheets

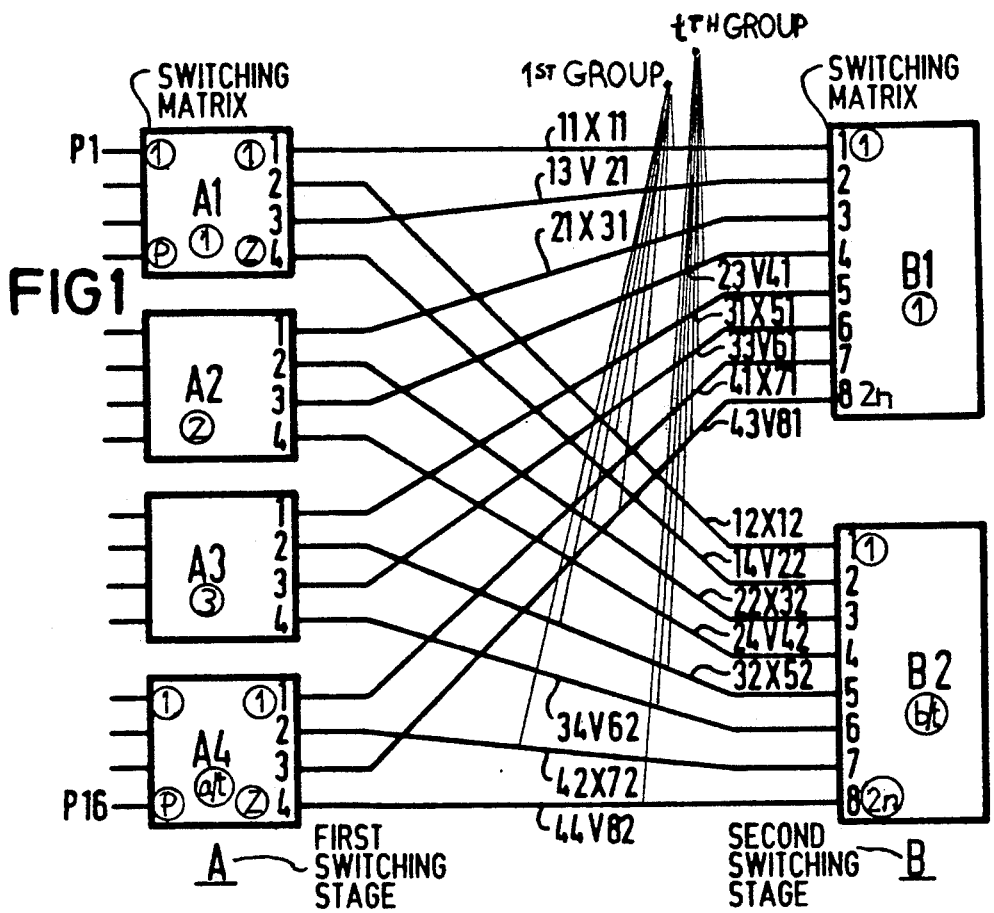
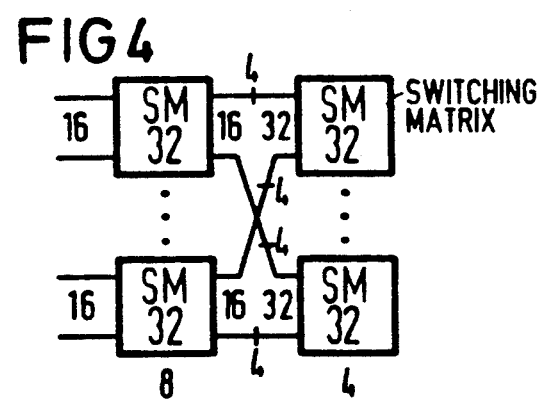
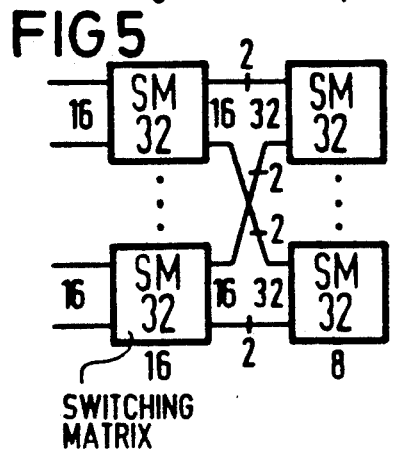
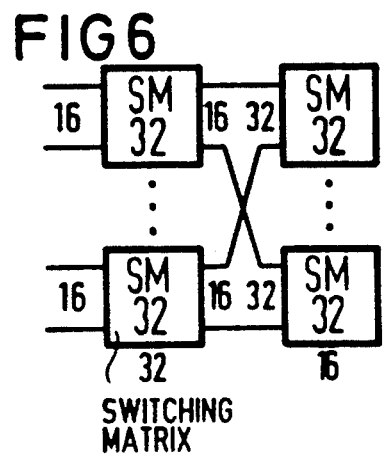

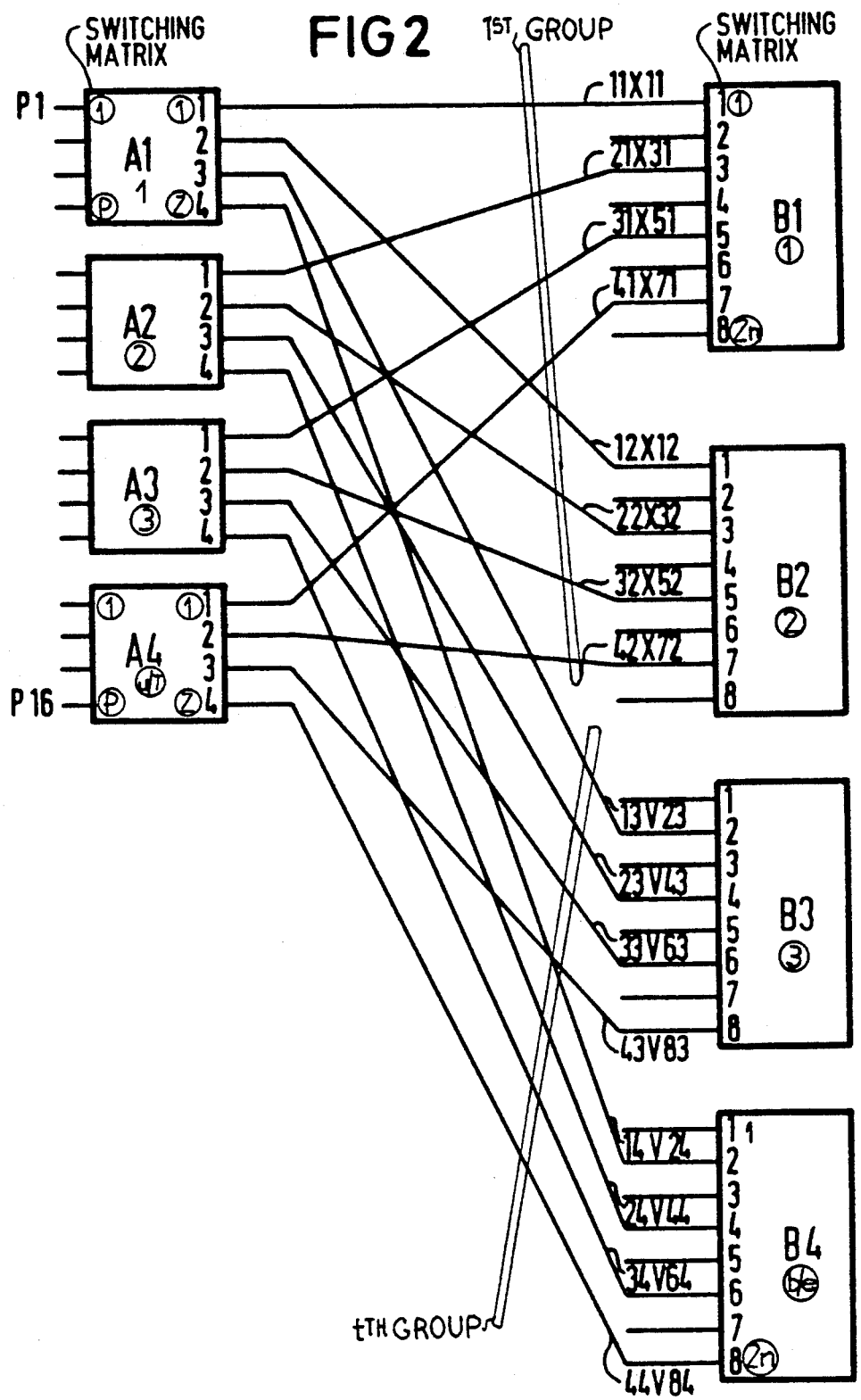

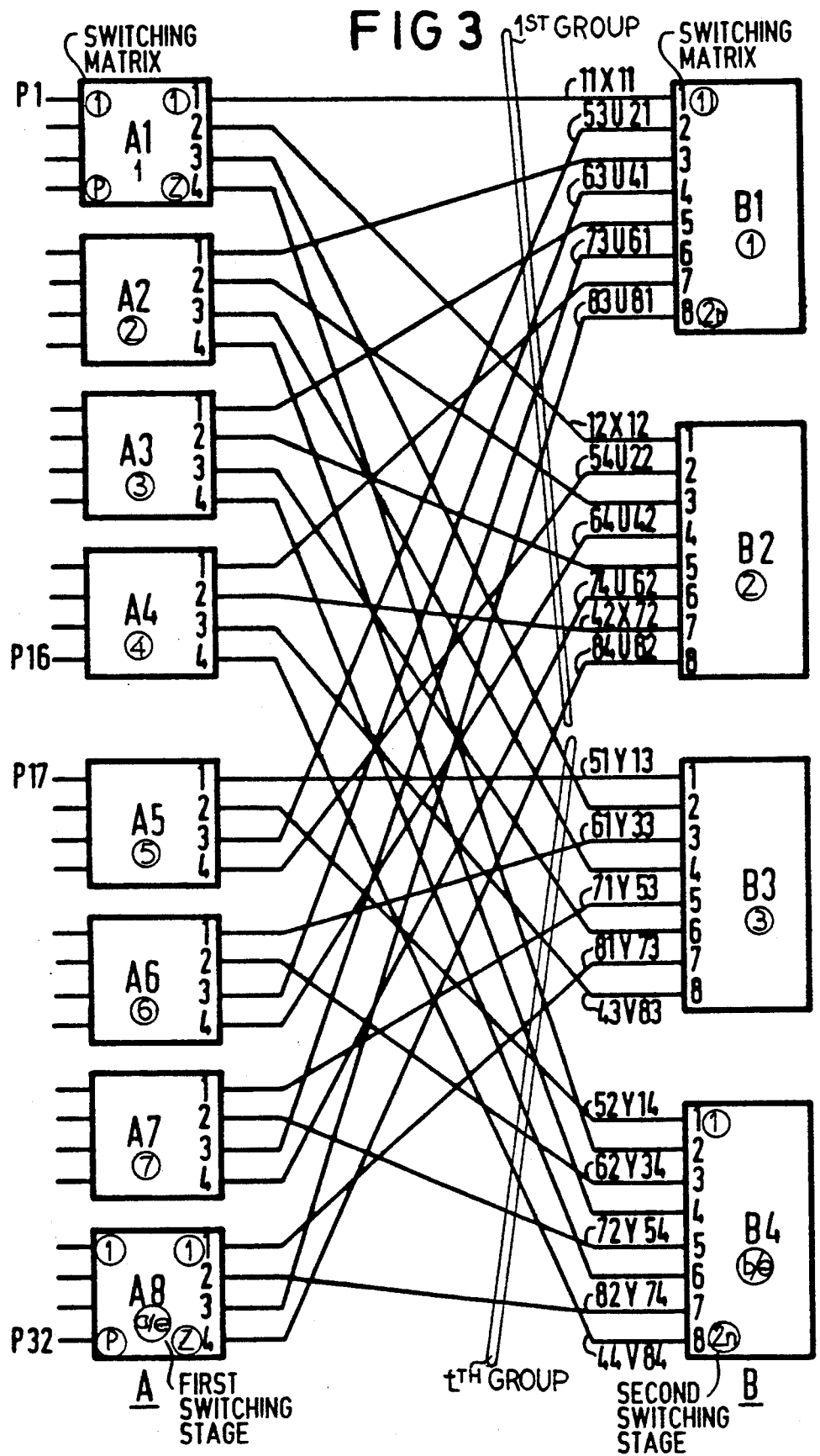

TWO-STAGE, AT LEAST DOUBLED ATM REVERSING SWITCHING NETWORK HAVING (2N×2N) SWITCHING MATRICES

BACKGROUND OF THE INVENTION

In recent developments of telecommunications technology and, in particular, in the development of broadband integrated services networks (B-ISDN), the asynchronous transfer mode (ATM) based on asynchronous time-division multiplex technique plays a significant part. The signal transmission is consequently undertaken in a bit stream that is subdivided into cells, each respectively composed of header and useful information part, of a constant length of, for example, 53 octets that are occupied as needed with packeted messages. Special empty cells are transmitted when no useful information is to be currently communicated. Virtual connections, i.e. connections that only in fact use a path section when a message packet (block) is in fact to be communicated via the path section are set up in ATM switching centers, whereby every packet contains, among other things, an address covering, for example, two octets in its header for the unambiguous allocation of the packet to a specific virtual connection. Based on the measure of the respective selection information, every packet at the input to the switching network can thereby contain the complete information for its route through the switching network. Using this information, the switching elements themselves then switch the packet on the defined route (self-routing network) (see, for example, Telcom Report 11 (1988) 6, 210 ... 213). A two-stage reversing switching network having (32×32) switching matrices can thereby be provided as the switching network, these switching matrices being in turn each respectively capable of being formed of four switching pyramids formed with (16×8) switching elements (see, for example, ISS'90 Proceedings Vol. 1, Paper A2.3, FIG. 10). Since switching equipment must guarantee a practically interruption-free switching operation, at least two redundant switching levels will be provided, i.e. the switching network will be doubled (see, for example, EP-A1-0 384 936).

When establishing switching centers, the case is often is such that, given what is initially a limited number of subscribers, a fully expanded switching network is not initially required. On the contrary, only a partially expanded switching network is adequate, which is capable of being later expanded to form a fully expanded switching network. In order to be able to undertake such an expansion without interrupting operations, a maximally configured, second (reversing) switching stage is usually provided from the very outset in a two-stage reversing switching network even when this only has a partial configuration level. The switching matrices of the second (reversing) switching stage that are already provided in a partial configuration of the switching network, but that are not yet required, then represent an unutilized dedicate resource.

SUMMARY OF THE INVENTION

It is an object of the present invention to provide a two-stage, doubled ATM reversing switching network having (2n×2n) switching matrices of full availability that can be expanded without interrupting operations, even without such a advanced dedication.

The present invention is directed to a two-stage, at least doubled ATM self-routing reversing switching network having (2n×2n) switching matrices wherein every switching matrix of the first switching stage having a switching matrices given full configuration of the switching network can be wired with p input/output ports and with z duplex links (where p+z=2n) and every switching matrix of the second switching stage can be wired with 2n duplex links. Every switching matrix of the second switching stage having b switching matrices given full configuration of the switching arrangement is connected via at least one duplex link to every switching matrix of the first switching stage. This switching network is inventively characterized in that, when every switching matrix of the second switching stage is connected with $2^k$ groups of duplex links (with $k= \ldots, 2, 1, 0$) every switching matrix of the second switching stage is connected to every switching matrix of the first switching stage via at least respectively one duplex link of each of these $2^k$ groups of duplex links.

Given partial configuration of the switching network, the second switching stage has only $$\frac{b}{t}$$

switching matrices with $t=2j$ and $j= \ldots, 2, 1$) that are connected to each of a maximum of $$\frac{a}{t}$$

switching matrices of the first switching stage via respectively t groups of duplex links, whereof, given an expansion of the switching network to $$\frac{b}{e}$$

switching matrices in the second switching stage and a maximum of $$\frac{a}{e}$$

switching matrices in the first switching stage, respectively only e groups of duplex links (with $e=2^i$ and $i= \ldots, 2, 1, 0; i<j$) remain between the previously existing switching matrices. These groups of duplex links are filled up with duplex links connecting the previously existing switching matrices of the second switching stage to added switching matrices of the first switching stage. The remaining t−e groups connect the added switching matrices of the second switching stage to the previously existing switching matrices of the first switching stage, likewise via respectively e groups of duplex links, whose line locations in the switching matrices connected to one another by them being the same as the line locations of the duplex links not remaining in the expansion between previously existing switching matrices in the switching matrices connected to one another by these in the previous partial configuration. These are filled out in a corresponding manner by the duplex links connecting added switching matrices of the second switching stage to added switching matrices of the first switching stage. Only duplex links of one and the same group of duplex links are occupied in each switching matrix of the second switching stage, at least for every connection that lasts in the expansion of the switching network.

The present invention has the advantage of not having to fully expand the second (reversing) switching stage from the very outset given a partial configuration of the switching network and yet being able to undertake an expansion (by re-equipping both the first switching stage as well as the second switching stage) given unmodified self-routing headers identical for both (redundancy) levels of the doubled switching network without interrupting operations and, thus, without a loss of existing connections. In a further development of the present invention, the one (redundancy) level of the doubled switching network is first placed out of service and is expanded by adding $$\frac{b}{e} - \frac{b}{t}$$

switching matrices in the second switching stage and connecting every added switching matrix of the second switching stage to every switching matrix of the first switching stage via respectively one duplex link of at least one group of duplex links whose line locations in the switching matrices that they connect to one another are the same as the line locations of the duplex links not remaining between previously existing switching matrices in the expansion in the switching matrices connected to one another by these in the previous partial configuration. After the reinitialization of the one redundancy level, the same procedures are implemented for the other (redundancy) level or levels of the switching network.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1, FIG. 2 and FIG. 3 depict an exemplary embodiment of a two-stage ATM reversing switching network in the condition of a partial configuration (FIG. 1) and after an expansion (FIG. 2 and FIG. 3); and FIG. 4, FIG. 5 and FIG. 6 show further switching networks of this type in different levels of configuration.

DESCRIPTION OF THE PREFERRED EMBODIMENT

The ATM reversing switching network depicted in FIG. 1 has a first switching stage A equipped in the partial configuration level with $$\frac{a}{t}$$

switching matrices (with $t = 2^j$ and $j = \ldots, 2, 1$), with $$\frac{a}{t} = \frac{a}{2} = 4$$

switching matrices A1, A2, A3, A4 in the example and has a second switching stage B equipped with $$\frac{b}{t}$$

switching matrices, $$\frac{b}{t} = \frac{b}{2} = 2$$

switching matrices B1, B2 in the example. For the sake of greater clarity, the switching matrices are thereby shown as (8×8) switching matrices. In practice, for example, (32×32) switching matrices each having 32 input/outputs can be provided and these can be fashioned as what are referred to as SM32 modules composed of four switching pyramids formed with what are referred to as (16×8) switching elements, as known, for example, from ISS'90 Proceedings Vol. I, pages 105 .. . 110, FIG. 10.

According to FIG. 1, every switching matrix A1, .. . ,A4 of the A-switching stage A is wired with p=4 bidirectional input/output ports and with z=4 duplex links; every switching matrix B1 and B2 of the B-switching stage B according to FIG. 1 is wired with $2^k$ groups of duplex links (with k= ..., 2, 1, 0), with $2^k = 2^1 = 2$ groups (X and V) of duplex links in the example, 11X11, 21X31, 31X51, 41X71, 13V21, 23V41, 33V61, 43V81; or 12X12, 22X32, 32X52, 42X72, 14V22, 24V42, 34V62, 44V82. Every switching matrix (for example, B1) of the B-switching stage B is thereby connected to every switching matrix (for example, A1) of the A-switching stage A via at least respectively one duplex link (in the example, 11X11 and 13V21) of each of $t = 2^1 = 2$ groups (X and V) of duplex links, whereby every switching matrix of the B-switching stage B is connected to every switching matrix of the A-switching stage A via respectively exactly one duplex link (in the example, 11X11 and 13V21) of every group (X and V) of duplex links in the switching network depicted in FIG. 1.

Let it be noted that FIG. 1 shows only one (redundancy) level of a redundant switching network that has two or more such parallel levels, i.e. doubled or multiple levels, whose individual (redundancy) levels can each respectively carry the full traffic and be respectively switched off and on without interrupting operations. Message packets (ATM cells) supplied and proceeding from an offering trunk and to which the full path information was thereby respectively attached preceding the switching network can (after a corresponding duplication or, respectively, multiplication) thereby be transmitted via the switching network levels parallel to one another to the serving trunk that comes into consideration for the respective virtual connection and, at the latter, can be again restored to form a single ATM cell, as is intrinsically known (from EP-A1-0 384 936) and which therefore need not be set forth in greater detail here. With respect thereto, let it be specifically noted that, in the path finding, only duplex links of one and the same group of duplex links, the duplex links 11X11 and 41X71 (or the duplex links 13V21 and 43V81) in the example, may potentially be occupied in the respective switching matrix of the B-switching stage B, for example in the switching matrix B1, in the switching network (redundancy) level for every connection of two input/output ports, for example the ports P1 and P16.

An expansion of the switching network depicted in FIG. 1 is required when all bidirectional ports P1,...,P16 of the A-switching stage A are connected and a further system expansion is necessary. The present invention now enables the switching matrices of the B-switching stage B to be multiplied $(2^{j-i})$-fold with $j= \ldots, 2, 1$ and $i= \ldots, 1, 0$; $i<j$, i.e. a doubling, and potentially even a multiple doubling, of the number of switching matrices given a halving, and potentially even a multiple halving, of the plurality of duplex link groups and filling of the duplex link groups between A-switching stage and B-switching stage. In accordance therewith the A-switching stage can be re-equipped to conform to the current requirements.

In an expansion of the switching network from, in the example of FIG. 1, sixteen ports P2, ... ,P16 to, in the example of FIG. 3, a maximum of thirty-two ports P1, ... ,P16, P17, ... ,P32, a maximum of four further switching matrices A5, ... ,A8 (in FIG. 2) can be added to the initially four switching matrices A1, ... ,A4 (in FIG. 1 and in FIG. 2) of the A-switching stage after corresponding switching matrices B3, B4 (in FIG. 2 and in FIG. 3) had been previously added in the B-switching stage B. When, in the partial configuration of the switching network according to FIG. 1, the $$\frac{b}{t} = 2$$

switching matrices B1, B2 of the B-switching stage were connected to each of the $$\frac{a}{t} = 4$$

switching matrices A1, ... ,A4 of the A-switching stage via respectively $t=2$ groups (X, V) of duplex links, and, given an expansion of the switching network to $$\frac{b}{e}$$

switching matrices in the B-switching stage (with $e=2^i$ and $i= \ldots, 2, 1, 0$; $i<j$) and a maximum of $$\frac{a}{e}$$

switching matrices in the A-switching stage, then only e groups of duplex links of these duplex links remain between the previously existing switching matrices. These e groups of duplex links are to be filled up with duplex links that connect the previously existing switching matrices B1, B2 of the B-switching stage to added switching matrices of the A-switching stage.

In the exemplary embodiment of FIG. 1, $e=1$ (which means that the switching arrangement has reached its full configuration level) and only one group (X +U) of duplex links 11X11, ... ,42X72 remain between the previously existing switching matrices A1, ... ,A4; B1, B2. This one group is thereby filled up by duplex links 53U21, 63U41, 73U61, 83U81 and 54U22, 64U42, 74U62, 84U82 which connect the previously existing switching matrices B1, B2 of the B-switching stage to switching matrices A5, ... ,A8 of the A-switching stage that have been added according to FIG. 3.

Further t−e duplex link groups connect the added switching matrices of the B-switching stage to every switching matrix of the A-switching stage, likewise via respectively e groups of duplex links whose line locations in the switching matrices that they connect to one another are thereby identical to the line locations that the duplex links not remaining between previously existing switching matrices in the expansion had in the switching matrices connected to one another by these in the previous partial configuration level. In the exemplary embodiment according to FIG. 2, the duplex links 13V23, 23V43, 33V63, 43V83 and 14V24, 24V44, 34V64, 44V84 connect the added switching matrices B3 and B4 of the B-switching stage to the switching matrices A1, ... ,A4 of the A-switching stage that were already previously present. The line locations in the switching matrices connected to one another by these duplex links, for example the line location 3 in the switching matrix A1 for the duplex link 13V23 and the line location 2 in the switching matrix B3, are the same as the line locations 3 in the switching matrix A1 and 2 in the switching matrix B1 that the corresponding duplex link (in the example, the duplex link 13V21) had in the switching matrices, the switching matrices A1 and B1 in the example, that were connected to one another by these in the previous partial configuration level. The path information (self-routing header) of the individual cells is thereby respectively the same for the individual duplex links ... V ... before and after the expansion.

When, according to FIG. 3, switching matrices A5, ... ,A8 are added in the A-switching stage, the duplex link group (V+Y) containing the duplex links ... V ... is to be correspondingly filled up by the duplex links that connect the switching matrices of the B-switching stage added according to FIG. 2 to the switching matrices of the A-switching stage added according to FIG. 3. In the exemplary embodiment of FIG. 3, these are the duplex links 51Y13, 61Y33, 71Y53, 81Y73 and 52Y14, 62Y32, 72Y54, 82Y74.

Given a switching network having a plurality of (redundancy) levels, whereof one is indicated in FIG. 1, FIG. 2 and FIG. 3, an expansion then proceeds in the following manner. Proceeding therefrom that only duplex links of one and the same group (X or V) of links (11X11, ... ,41X71; 12X12, ... ,42X72 in FIG. 1 and in FIG. 2; or 13V21, ... ,43V81; 14V22, ... ,44V82 in FIG. 1 and 13V23, ... ,43V83; 14V24, ... ,44V84 in FIG. 2) are occupied in the path finding (to be undertaken, moreover, in a known way) in every switching matrix of the B-switching stage, at least for every connection chronologically extending into the expansion phase, i.e. from the very beginning for semi-permanent connections and at least in timely fashion before entering into the expansion phase for the other connections, one (redundancy) level of the switching network is first taken out of service, whereas the other level or levels can continue to operate without interruptions in operations. The additional switching matrices (B3, B4 in FIG. 2) of the B-switching stage B can then be added into the out-of-service (redundancy) level and the link cabling can be reconfigured, as may be fundamentally seen from FIG. 2.

In the example shown here, the duplex links of the group X between the switching matrices A1, A2 of the A-switching stage and the switching matrices B1, B2 of the B-switching stage are retained, whereas the duplex links of the group V now connect the switching matrices A1, A2 of the A-switching stage to the added switching matrices B3, B4 of the B-switching stage. The line locations in the switching matrices connected to one another by these duplex links, for example the line location 3 in the switching matrix A1 and the line location 2 in the switching matrix B3 for the duplex link 13V23, are identical to the line locations 3 in the switching matrix A1 and 2 in the switching matrix B1 that the corresponding duplex link (the duplex link 13V21 in the example) had in the switching matrices, the switching matrices A1 and B1 in the example, connected to one another by this duplex link in the previous partial configuration level. Subsequently (and potentially after an off-line test is implemented) the expanded (redundancy) level of the switching network can be placed back into service and the same procedure can be implemented for the second redundancy level (and, subsequently, for every other potentially further redundancy level).

Since the routing information for the individual useful connections do not change with the new configuration, partially configured and expanded configuration level are the same for all switching matrices (A1, ... ,A4) of the A-switching stage that were already present before the expansion as seen from the point of view of the controller of the exchange side and connections can be set up and cleared down during the expansion phase as well.

Let the following also be noted in conclusion. The present invention has been set forth above on the basis of FIG. 1 through FIG. 3 with reference to the example of an expansion of the switching network to twice its size, the full configuration level of the switching network having been simultaneously reached therewith in the exemplary embodiment. In corresponding manner, a switching network, however, can also be expanded from a lower partial configuration level into, initially, a higher partial configuration level, as is the case, for example, given an expansion of the switching network depicted in FIG. 4 having a maximum of 128 bidirectional ports to form a switching network depicted in FIG. 5 having a maximum of 256 bidirectional ports. Furthermore, the switching network can also be immediately expanded by more than one power of 2, as is the case given an expansion of the switching network depicted in FIG. 4 to the switching network depicted in FIG. 6 having a maximum of 528 bidirectional ports.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A two-stage, at least doubled ATM self-routing reversing switching network, comprising: $2n \times 2n$ switching matrices, every switching matrix of a first switching stage having a switching matrices, given full configuration of the switching network, connectable to p input/output ports and to z duplex links, where $p+z=2n$, and every switching matrix of a second switching stage connectable to 2n duplex links, every switching matrix of the second switching stage having b switching matrices, given full configuration of the switching network, connectable to every switching matrix of the first switching stage via at least one duplex link; for connection of each switching matrix of the second switching state to $2^k$ groups of duplex links, where k is a finite number and where $k= \ldots, 2, 1, 0$, every switching matrix of the second switching stage connected to every switching matrix of the first switching stage via at least one respective duplex link of each of the $2^k$ groups of duplex links; for partial configuration of the switching network, the second switching stage having only $$\frac{b}{t}$$

switching matrices where $t=2^j$ and $j= \ldots, 2, 1$ and where j is a finite number, that are connected to each of a maximum of $$\frac{a}{t}$$

switching matrices of the first switching stage via respectively t groups of duplex links.

2. The two-stage, at least doubled ATM self-routing reversing switching network according to claim 1, wherein only respectively duplex links of one and the same group of duplex links are occupied in every switching matrix of the second switching stage for an individual connection.

3. A method for expanding a two-stage, at least doubled ATM reversing switching network having $2n \times 2n$ switching matrices, wherein every switching matrix of a first switching stage having a switching matrices, given full configuration of the switching network, is connectable to p input/output ports and to z duplex links, where $p+z=2n$ and every switching matrix of a second switching stage is connectable to 2n duplex links, whereby every switching matrix of the second switching stage having b switching matrices, given full configuration of the switching network, is connected to every switching matrix of the first switching stage via at least one duplex link, comprising the steps of:

(a) when wiring each switching matrix of the second switching stage to $2^k$ groups of duplex links, where k is a finite number and where $k= \ldots, 2, 1, 0$, connecting every switching matrix of the second switching stage to every switching matrix of the first switching stage via at least one respective duplex link of each of the $2^k$ groups of duplex links;

(b) given partial configuration of the switching network, providing the second switching stage with only $$\frac{b}{t}$$

switching matrices, where $t=2^j$ and $j= \ldots, 2, 1$ and where j is a finite number that are connected to each of a maximum of $$\frac{a}{t}$$

switching matrices of the first switching stage via respectively t groups of duplex links whereof, given an expansion of the switching network to $$\frac{b}{e}$$

switching matrices in the second switching stage and second switching stage and a maximum of $\frac{a}{e}$ switching matrices in the first switching stage, leaving only respectively e groups of duplex links, where $e = 2^i$ and $i = \ldots, 2, 1, 0$; $i < j$, and where i is a finite number, of the t groups of duplex links between previously existing switching matrices from the partial configurations that are filled out by duplex links connecting the previously existing switching matrices of the second switching stage to added switching matrices of the first switching stage, and providing further t-e groups of duplex lines that connect the added switching matrices of the second switching stage to the previously existing switching matrices of the first switching stage via respective e groups of duplex links whose line locations in the switching matrices that the further t-e groups connect to one another are identical to the line locations that original duplex links, that do not remain between previously existing switching matrices had in the switching matrices, connected to one another by the original duplex lines in the previous partial configuration and that are correspondingly filled up by duplex lines connecting the added switching matrices of the second switching stage to added switching matrices of the first switching stage, wherein only duplex links of one and the same group of duplex links are occupied in every switching matrix of the second switching stage for every connection lasting during an expansion of the switching network;

(c) taking out of service one redundancy level of a doubled switching network;

(d) expanding the one redundancy level by adding $$\frac{b}{e} - \frac{b}{t}$$

switching matrices in the second switching stage and connecting every added switching matrix of the second switching stage to every switching matrix of the first switching stage via at least respectively one duplex link of at least one group of duplex links, whose line locations in the switching matrices that they connect to one another are the same as line locations of original duplex links not remaining between previously existing switching matrices in the expansion in the switching matrices connected to one another by the original duplex links in the previous partial configuration; and (e) after a return of said one redundancy level into service, repeating steps (c) and (d) for the other redundancy level or levels of the switching network.

4. A method for expanding a two-stage, at least doubled ATM self-routing reversing switching network having 2n×2n switching matrices, wherein every switching matrix of a first switching stage having a switching matrices, given full configuration of the switching network, connectable to p input/output ports and to z duplex links, where p+z=2n, and every switching matrix of a second switching stage is connectable to 2n duplex links, whereby every switching matrix of the second switching stage having b switching matrices, given full configuration of the switching network, is connected to every switching matrix of the first switching stage via at least one duplex link, comprising the steps of:

(a) when wiring each switching matrix of the second switching stage to $2^k$ groups of duplex links, where k is a finite number and where $k = \ldots, 2, 1, 0$, connecting every switching matrix of the second switching stage to every switching matrix of the first switching stage via at least one respective duplex link of each of the $2^k$ groups of duplex links;

(b) given partial configuration of the switching network, providing the second switching stage with only $$\frac{b}{t}$$

switching matrices, where $t = 2^j$ and $j = \ldots, 2, 1$ and where j is a finite number, that are connected to each of a maximum of $$\frac{a}{t}$$

switching matrices of the first switching stage via respectively t groups of duplex links whereof, given an expansion of the switching network to $$\frac{b}{e}$$

switching matrices in the second switching stage and maximum of $$\frac{a}{e}$$

switching matrices in the first switching stage, leaving only respectively e groups of duplex links, where $e = 2^j$ and $i = \ldots, 2, 1, 0$; $i < j$, and where i is a finite number, of the t group of duplex lines between previously existing switching matrices from the partial configuration that are filled out by duplex links connecting the previously existing switching matrices of the second switching stage to added switching matrices of the first switching stage, and providing further t-e groups of duplex lines that connect the added switching matrices of the second switching stage to the previously existing switching matrices of the first switching stage via respective e groups of duplex links whose line locations in the switching matrices that the further t-e groups connect to one another are identical to the line locations that original duplex links, that do not remain between previously existing switching matrices had in the switching matrices, connected to one another by the original duplex lines in the previous partial configuration and that are correspondingly filled up by the duplex lines connecting the added switching matrices of the second switching stage to added switching matrices of the first switching stage, wherein only duplex links of one and the same group of duplex links are occupied in every switching matrix of the second switching stage for every connection lasting during an expansion of the switching network.

5. The method for expanding a two-stage, at least doubled ATM self-routing reversing switching network according to claim 4, wherein the method further comprises the steps of:

(c) first taking out of service one redundancy level of a doubled switching network and (d) expanding the one redundancy level by adding $$\frac{b}{e} - \frac{b}{t}$$

switching matrices in the second switching stage and connecting every added switching matrix of the second switching stage to every switching matrix of the first switching stage via at least respectively one duplex link of at lest one group of duplex links, whose line locations in the switching matrices that they connect to one another are the same as the line locations of original duplex links not remaining between previously existing switching matrices in the expansion in the switching matrices connected to one another by the original duplex links in the previous partial configuration; and (e) after a return of said one redundancy level into service, repeating steps (c) and (d) for the other redundancy level or levels of the switching network.

6. The two-stage, at least doubled ATM self-routing reversing switching network according to claim 1, wherein given an expansion of the switching network to $$\frac{b}{e}$$

switching matrices in the second switching stage and a maximum of $$\frac{a}{e}$$

switching matrices in the first switching stage, only respectively e groups of duplex links, where $e=2^i$ and $i = \ldots, 2, 1, 0; i<j$, and wherein i is a finite number, of the t groups of duplex links remain between previously existing switching matrices from the partial configuration that are filled out by duplex links connecting the previously existing switching matrices of the second switching stage to added switching matrices of the first switching stage, and further t-e groups of duplex lines connecting added switching matrices of the second switching stage to the previously existing switching matrices of the first switching stage, also via respective e groups of duplex links whose line locations in the switching matrices that the further t-e groups connect to one another are identical to the line locations that original duplex links, that do not remain between previously existing switching matrices had in the switching matrices, connected to one another by the original duplex lines in the previous partial configuration and that are correspondingly filled up by duplex lines connecting the added switching matrices of the second switching stage to the added switching matrices of the first switching stage; and only duplex links of one and the same group of duplex links being occupied in every switching matrix of the second switching stage for every connection lasting during an expansion of the switching network.

* * * * *